June 4, 1963  G. A. BALDWIN ET AL  3,092,420
WHEEL COVER
Filed April 25, 1960  2 Sheets-Sheet 2

INVENTORS
Glenn A. Baldwin,
BY Thomas B. Frame, &
Arnold J. Maletzke
Herbert Furman
ATTORNEY

United States Patent Office 3,092,420
Patented June 4, 1963

3,092,420
WHEEL COVER
Glenn A. Baldwin, Birmingham, Mich., and Thomas B. Frame, Syracuse, and Arnold J. Maletzke, Fayetteville, N.Y., assignors to General Motors Corporation, Detroit, Mich., a corporation of Delaware
Filed Apr. 25, 1960, Ser. No. 24,454
1 Claim. (Cl. 301—37)

This invention relates to wheel covers, and more particularly to an improved wheel cover and mounting means therefor.

The wheel cover and mounting means of this invention are particularly intended for use with large size vehicle wheels such as used on buses and trucks. At the present time it is well known in the prior art to provide wheel covers with integral retaining means which grip a wheel rim flange in order to mount the covers on the wheels. Wheel covers of this type are useful for smaller size vehicle wheels such as used on automobiles, but have certain disadvantages when used on large size vehicle wheels, particularly because the weight of the cover increases the relative torque between the cover and the wheel to an extent where the covers are often thrown off the wheels of the trucks or buses.

The wheel cover and mounting means of this invention generally include a large size wheel cover which nests within the outer rim portion of the wheel and mounting means including a mounting bracket supported on the vehicle axle and secured to the cover centrally thereof so as to retain the cover on the wheel under all conditions. The central portion of the cover is secured to the mounting bracket by a single bolt and in order to prevent relative rotational movement between the cover and the bracket, the bracket is provided with a tab which is received within an opening in the cover. Further, the outer periphery of the cover includes a return bent flange which supports resilient bumpers engageable under compression with the outer rim portion of the wheel so as to prevent rattling. An alternate mounting means includes a spacer member between the mounting bracket and the cover so that a single cover and a single mounting bracket can be used for various buses and trucks wherein the spatial relationship between vehicle axle and the outer rim portion of the wheel varies.

The primary object of this invention is to provide an improved wheel cover and mounting means therefor for large size vehicle wheels such as used on trucks or buses. Another object of this invention is to provide a wheel cover and mounting means therefor for large size vehicle wheels such as used on trucks or busses wherein mounting means are provided to support the wheel cover centrally thereof on the vehicle axle and to prevent relative rotational movement between the wheel cover and the wheel. A further object of this invention is to provide an improved wheel cover and mounting means therefor for large size vehicle wheels such as used on trucks or busses wherein mounting means are provided to support the wheel cover centrally thereof on the vehicle axle, with the mounting means including means for accommodating various spatial relationships between the vehicle axle and the outer wheel rim portion of the truck or bus wheel.

These and other objects of this invention will be readily apparent from the following specification and drawings, wherein.

Figure 1:
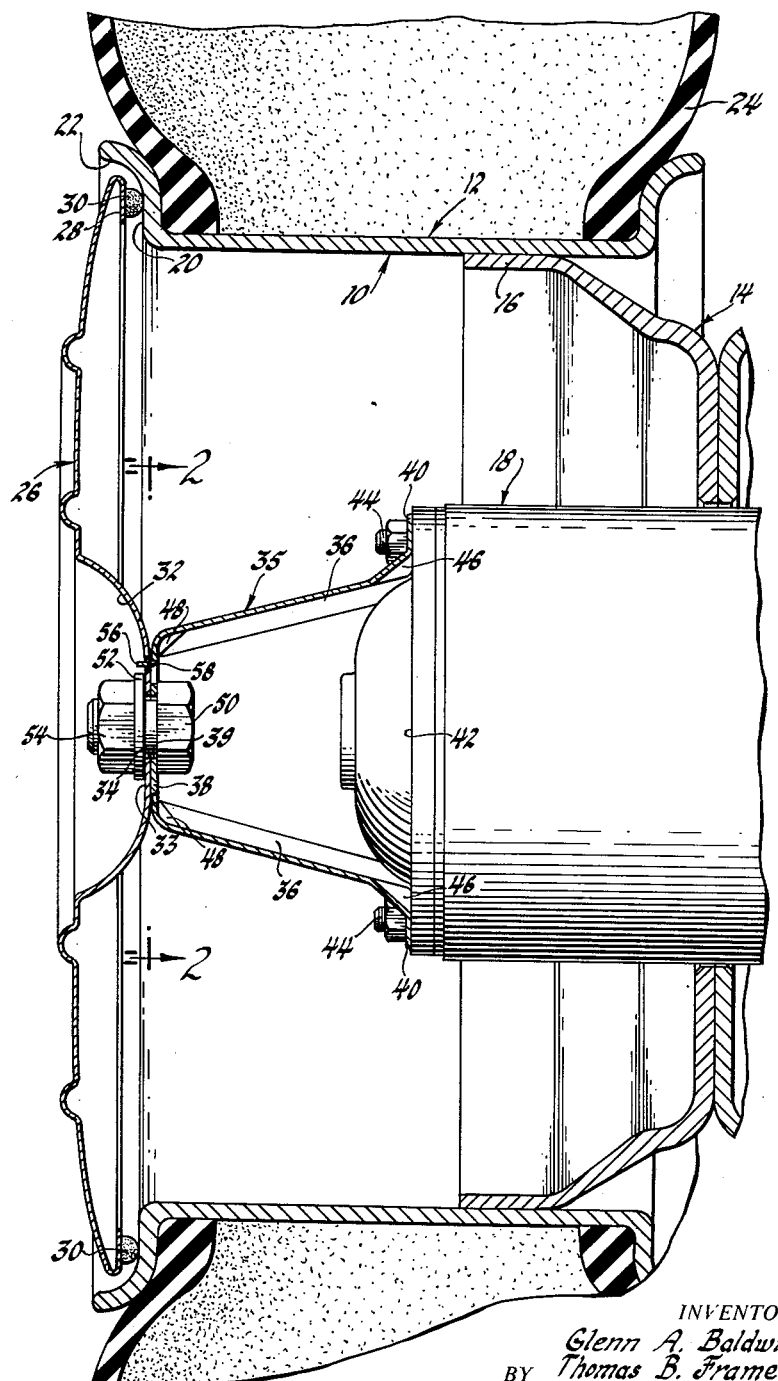
FIGURE 1 is a sectional view of a vehicle wheel mounted on a vehicle axle and embodying a wheel cover and mounting means therefor according to this invention.

Referring now particularly to FIGURE 1 of the drawings, a large size vehicle wheel 10, such as used on trucks or busses, includes an annular wheel rim 12 and a wheel spider 14 having an annular flange 16 which is suitably secured to the wheel rim. The wheel spider 14 is suitably mounted on a vehicle axle 18. The wheel rim 12 includes an annular axially outwardly facing and radially extending outer rim flange 20 which merges arcuately into an annular axially outwardly extending and radially facing terminal flange 22. As shown, the wheel rim 12 and the flanges 20 and 22 thereof support a tire 24.

An annular wheel cover 26 fits within the terminal flange 22, being spaced therefrom, and includes a return bent radially inwardly extending terminal flange 28 which is located in juxtaposed relationship to the flange 20 of the wheel rim. The flange 28 mounts a number of spaced rubber bumpers 30 which resiliently bear against flange 20 so as to space the cover 26 therefrom and to also prevent rattling between the cover and the wheel rim. Cover 26 further includes a central dished portion 32 having a circular axially facing and radially extending flat bottom portion 33 apertured at 34.

Figure 2:
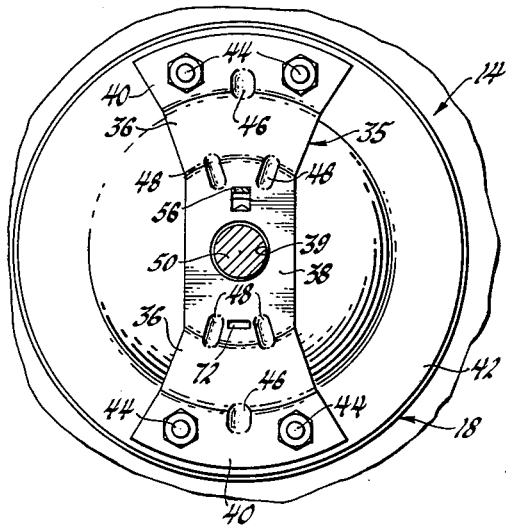
FIGURE 2 is a view taken generally along the plane indicated by line 2—2 of FIGURE 1.

As best shown in FIGURES 1 and 2, a U-shaped mounting bracket 35 includes a pair of tapered legs 36 which are joined together by an axially facing and radially extending flat base 38 apertured at 39. Each of the legs 36 terminates in a laterally extending flange 40 adapted to bear against the outer end 42 of the axle 18 and being bolted thereto at 44 in order to mount the bracket on the axle. Embossed strengthening ribs 46 are provided between the legs 36 and flanges 40 and further embossed strengthening ribs 48 are provided between the legs 36 and the base 38.

As can be seen in FIGURE 1, the bottom portion 33 of cover 26 bears against base 38 in surface to surface relationship, with apertures 34 and 39 being aligned with respect to each other. A bolt 50 has the head thereof welded or otherwise fixedly secured to the base 38 of bracket 35, with the shank of the bolt extending outwardly through apertures 34 and 39. A washer 52 and nut 54 received on the shank of the bolt secure the cover member 26 to the bracket 35 so as to mount the cover member on the wheel 10. The rubber bumpers 30 normally space the cover portion 33 slightly from the base 38 of the bracket 35 so that the center portion of the cover is placed under tension and the rubber bumpers 30 are slightly compressed when the washer 52 and nut 54 are mounted on the bolt 50 to ensure that bumpers 30 will tightly engage flange 20 to prevent rattling between the cover and the wheel.

Since the cover 26 is of large size and is secured centrally thereof to the wheel by only a single bolt, the starting and stopping movement of the bus or truck will cause the cover to rotate relative to the wheel 10 due to the weight of the cover and the relative torque between the cover and the wheel. This rotational movement is undesirable since it may cause the nut 54 to unthread from the bolt 50 and thereby possibly cause loss of the cover. In order to prevent such rotational movement, the base 38 of bracket 35 is provided with a lateral axially outwardly extending lanced out tab 56 which is received within an aperture 58 in the portion 33 of the cover. Thus, rotational movement between the cover and the wheel is effectively prevented.

Figure 3:
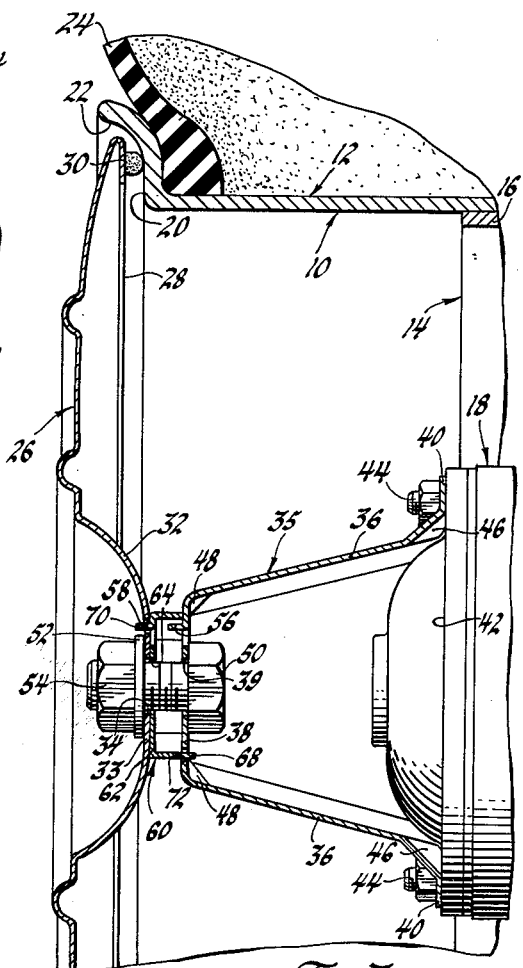
FIGURE 3 is a partial view similar to FIGURE 1 and showing the means for accommodating various spatial relationships between the vehicle axle and the outer wheel rim portion.
Figure 4:
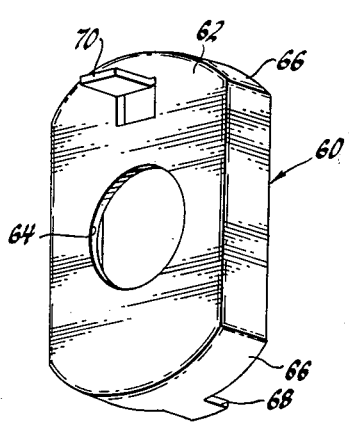
FIGURE 4 is an enlarged perspective view of a portion of FIGURE 3.

The spatial relationship between the outer end 42 of axle 18 and flange 20 of the wheel rim varies with various types of wheels. In order that the cover 26 and bracket 35 of this invention may be used with various types of wheels, regardless of the spatial relationship between the outer end of the axle and the wheel rim flange 20, the mounting means is easily adapted to include a spacer member to accommodate the variation in this spacing. Referring now particularly to FIGURES 3 and 4 of the drawings, wherein like numerals are used for like parts, such a spacer member 60 will be described.

As best shown in FIGURE 4, the spacer member is generally of cup shape and includes a flat base 62 which is apertured at 64. The end walls 66 of member 60 are arcuate in shape and one includes a tab 68. The base 62 of the spacer member further includes a struck out laterally extending tab 70. As can be seen in FIGURES 2 and 3, the base 38 of bracket 35 includes an aperture 72 located opposite to the tab 56. When the spacer member is used, as shown in FIGURE 3, the tab 68 of the spacer member fits within the aperture 72 of base 38 so as to locate the spacer member on the base of the bracket, with the tab 56 of base 38 located adjacent the opposite end wall of the spacer member generally in alignment with the tab 70 of the spacer member. The tab 70 is received within the aperture 58 of the cover so as to prevent rotational movement between the cover and the wheel. The washer 52 and nut 54 are then assembled to the bolt 50.

Thus, this invention provides an improved wheel cover and mounting means therefor particularly intended for use with large size wheels such as used on trucks or busses.

We claim:

In combination with the vehicle axle and a wheel assembly mounted thereon and including a laterally extending axially outwardly facing wheel rim flange merging into an axially outwardly extending wheel rim terminal flange, a wheel cover assembly for said wheel comprising, an annular cover member adapted to fit within said terminal flange in engagement with said axially facing flange, said cover member including a central axially dished concavity provided with a generally radially extending apertured flat bottom portion, a bracket member mounted on said axle and including an axially facing apertured base portion lying in a radial plane located adjacent to the radial plane of said axially facing wheel rim flange and normally spaced from the plane of said bottom portion, an apertured spacer member, interfitting means on said spacer member and base portion to prevent rotational movement therebetween, single bolt means extending through the apertures of said cover, said bracket and said spacer member to secure said central portion of said cover member to said spacer member and to said base portion of said bracket member to mount said cover member on said wheel and draw said bottom portion into engagement with said spacer member and resiliently hold said cover member against said axially facing wheel rim flange, the portion of said single bolt means located axially outwardly of said cover member being located within said concavity and axially inwardly of the axially outer surface of said cover member, and means located adjacent said securing means and interconnecting said spacer member and said cover member to prevent relative rotational movement therebetween, said last mentioned means including an extension on one of said members adapted to be received within a complementary shaped opening in the other of said members.

References Cited in the file of this patent

UNITED STATES PATENTS

| | | |
|---|---|---|
| 2,016,395 | Sinclair | Oct. 8, 1935 |
| 2,249,568 | Shinliver | July 15, 1941 |
| 2,493,366 | Simcich | Jan. 3, 1950 |
| 2,550,222 | Carlin | Apr. 24, 1951 |
| 2,722,822 | Thomas | Nov. 8, 1955 |
| 2,727,790 | Gaylord | Dec. 20, 1955 |
| 2,995,402 | Lyon | Aug. 8, 1961 |

FOREIGN PATENTS

| | | |
|---|---|---|
| 1,004,084 | France | Nov. 21, 1951 |
| 791,863 | Great Britain | Mar. 12, 1958 |